United States Patent
Rowe et al.

(10) Patent No.: US 6,682,421 B1
(45) Date of Patent: Jan. 27, 2004

(54) WIRELESS GAMING ENVIRONMENT

(75) Inventors: Richard E. Rowe, Reno, NV (US); Michael M. Oberberger, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/544,884

(22) Filed: Apr. 7, 2000

(51) Int. Cl.⁷ .................................................. A63F 13/00
(52) U.S. Cl. ............................. 463/25; 463/39; 463/29
(58) Field of Search .............................. 463/1, 16, 42, 463/43, 25; 700/91–93

(56) References Cited

U.S. PATENT DOCUMENTS

| | | | |
|---|---|---|---|
| 5,129,652 A | | 7/1992 | Wilkinson .................. 273/139 |
| 5,265,874 A | * | 11/1993 | Dickinson et al. ............ 463/42 |
| 5,557,086 A | * | 9/1996 | Schulze et al. ............. 235/380 |
| 5,618,045 A | | 4/1997 | Kagan et al. ................. 463/40 |
| 5,643,086 A | | 7/1997 | Alcorn et al. ................. 463/29 |
| 5,678,886 A | * | 10/1997 | Infanti ..................... 297/217.3 |
| 5,738,583 A | * | 4/1998 | Comas et al. ................ 463/40 |
| 5,741,183 A | | 4/1998 | Acres et al. .................. 463/42 |
| 5,761,647 A | | 6/1998 | Boushy ....................... 705/10 |
| 5,768,382 A | | 6/1998 | Schneier et al. .............. 380/23 |
| 5,770,533 A | * | 6/1998 | Franchi ....................... 463/42 |
| 5,779,545 A | * | 7/1998 | Berg et al. ................... 463/22 |
| 5,779,549 A | * | 7/1998 | Walker et al. ................ 463/42 |
| 5,795,228 A | | 8/1998 | Trumbull et al. ............. 463/42 |
| 5,797,085 A | * | 8/1998 | Beuk et al. ................... 455/88 |
| 5,871,398 A | | 2/1999 | Schneier et al. .............. 463/16 |
| 5,999,808 A | * | 12/1999 | LaDue ........................ 700/91 |
| 6,001,016 A | | 12/1999 | Walker et al. | |
| 6,012,832 A | | 1/2000 | Saunders et al. ........... 364/410 |
| 6,012,983 A | * | 1/2000 | Walker et al. ................ 463/20 |
| 6,019,283 A | * | 2/2000 | Lucero ....................... 235/380 |
| 6,048,269 A | * | 4/2000 | Burns et al. .................. 463/25 |
| 6,093,100 A | * | 7/2000 | Singer et al. ................. 463/13 |
| 6,104,815 A | | 8/2000 | Alcorn et al. ................ 380/251 |
| 6,106,396 A | | 8/2000 | Alcorn et al. ................. 463/29 |
| 6,110,041 A | | 8/2000 | Walker et al. | |
| 6,149,522 A | | 11/2000 | Alcorn et al. ................. 463/29 |
| 6,270,410 B1 | * | 8/2001 | DeMar et al. ................ 463/20 |
| 6,280,326 B1 | * | 8/2001 | Saunders ..................... 463/25 |
| 6,285,868 B1 | | 9/2001 | LaDue ....................... 455/410 |
| 6,340,331 B1 | * | 1/2002 | Saunders et al. ........... 235/380 |

FOREIGN PATENT DOCUMENTS

| | | | |
|---|---|---|---|
| DE | 195 02 613 A1 | 1/1995 | .......... G06F/19/00 |
| WO | WO 95/24689 | 9/1995 | |
| WO | WO 96/00950 | 1/1996 | |

* cited by examiner

*Primary Examiner*—John M. Hotaling, II
(74) *Attorney, Agent, or Firm*—Beyer Weaver Thomas LLP

(57) ABSTRACT

A disclosed hand-held device provides a game service system having a wire-less communication interface, a display screen and a microprocessor which generates a number of game service interfaces on the display screen. The hand-held device may input ticket voucher information and communicate with a remote transaction server such that a ticket voucher may be validated. Additionally, the hand-held device may be used to provide a variety of gaming services using different game service interfaces provided on the device. These hand-held devices may be checked out by a game service representative in a secure manner such that the game service representative may roam a game playing area and provide various game services to game players in the game playing area using the hand-held device. These game services may include ticket validation, a prize validation, food services, accommodation services or a gaming operations services.

31 Claims, 6 Drawing Sheets

WIRELESS GAMING ENVIRONMENT

BACKGROUND OF THE INVENTION

This invention relates to game playing services for gaming machines such as slot machines and video poker machines. More particularly, the present invention relates to methods of providing game services to game players such as ticket validation.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional method of dispensing coins or tokens as awards for winning game outcomes is being supplemented by ticket dispensers which print ticket vouchers that may be exchanged for cash or accepted as credit of indicia in other gaming machines for additional game play. An award ticket system, which allows award ticket vouchers to be dispensed and utilized by other gaming machines, increases the operational efficiency of maintaining a gaming machine and simplifies the player pay out process. An example of an award ticket system is the EZ pay ticket system by International Game Technology of Las Vegas, Nev.

Currently, ticket vouchers are primarily used as credit indicia for other gaming machines and may be exchanged for cash after the ticket voucher has been validated. However, ticket vouchers have many other potential uses. For example, a ticket voucher may be utilized as prize voucher, which may be redeemed for merchandise awarded for a particular game outcome, or as a service voucher for food, room upgrades or other forms of compensation.

An important component of an award ticket system is the ticket validation process. Typically, a game player's satisfaction with an award ticket system is based upon the ease by which the ticket vouchers may be validated or utilized within the context of game playing. When the ticket validation process is difficult, a game player may become dissatisfied with the game playing area offering the award ticket system and frequent a game playing area without an award ticket system or a game playing area offering a simpler ticket validation process. As an example, the ticket voucher validation process is described in relation to the EZ pay system. FIG. 1 is a block diagram of the components of the EZ pay ticket system. A first group of gaming machines, 65, 66, 67, 68, and 69 is shown connected to a first clerk validation terminal (CVT) 60 and a second group of gaming machines, 75, 76, 77, 78 and 79 is shown connected to a second CVT 70. All of the gaming machines print ticket vouchers which may be exchanged for cash or accepted as credit of indicia in other gaming machines. When the CVTs are not connected to one another, a ticket voucher printed from one gaming machine may be only be used as indicia of credit in another gaming machine which is in a group of gaming machines connected to the same clerk validation terminal. For example, an award ticket printed from gaming machine 65 might be used as credit of indicia in gaming machines 66, 67, 68 and 69, which are each connected to the CVT 60, but not in gaming machines 75, 76, 77, 78, and 79, which are each connected to the CVT 70.

The CVTs, 60 and 70, store ticket voucher information corresponding to the outstanding ticket vouchers that are waiting for redemption. This information is used when the tickets are validated and cashed out. The CVTs 60 and 70 store the information for the ticket vouchers printed by the gaming machines connected to the CVT. For example, CVT 60 stores ticket voucher information for ticket vouchers printed by gaming machines 65, 66, 67, 68, and 69. When a player wishes to cash out a ticket voucher and the CVT are not connected to one another, the player may redeem vouchers printed from a particular gaming machine at the CVT associated with the gaming machine. To cash out the ticket voucher, the ticket voucher is validated by comparing information obtained from the ticket with information stored within the CVT. After a ticket voucher has been cashed out, the CVT marks the ticket paid in a database to prevent a ticket voucher with similar information from being cashed multiple times.

Multiple groups of gaming machines connected to CVTs may be connected together in a cross validation network 45. The cross validation network is typically comprised of one or more concentrators 55 which accepts inputs from two or more CVTs and enables communications to and from the two or more CVTs using one communication line. The concentrator is connected to a front end controller 50 which may poll the CVTs for ticket voucher information. The front end controller is connected to an EZ pay server 10 which may provide a variety of information services for the award ticket system including accounting 20 and administration 15.

The cross validation network allows ticket vouchers generated by any gaming machine connected to the cross validation to be accepted by other gaming machines in the cross validation network 45. Additionally, the cross validation network allows a cashier at a cashier station 25, 30, and 35 to validate any ticket: voucher generated from a gaming machine within the cross validation network 45. To cash out a ticket voucher, a player may present a ticket voucher at one of the cashier stations 25, 30, and 35. Information obtained from the ticket voucher is used to validate the ticket by comparing information on the ticket with information stored on one of the CVTs connected to the cross validation network. As tickets are validated, this information may be sent to another computer 40 providing audit services.

In some instances, to validate and cash an EZ pay ticket voucher, a player must go to the location of the CVT associated with the gaming machines from which the ticket voucher was printed. When the CVTs are connected via a cross validation network, a player must locate a CVT or go to a cashier station at another location. On a large and crowded casino floor, a player may not wish to find the location of a CVT containing the redemption information needed to validate their ticket voucher or may not wish to locate, find and then wait in line at a cashier station to redeem their ticket voucher. Further, when the ticket voucher is for a service such as food or accommodations at a game playing area, a player may wish to take advantage of the service offered on the ticket voucher while continuing their game play or remaining in the game playing area. For example, when the ticket voucher is for a free meal, the player may wish to make a dinner reservation while continuing to play a game on a gaming machine or remaining near the gaming machine.

In view of the above, it would be desirable to provide a ticket voucher validation system for gaming machines that generate and accept ticket vouchers which overcome the limitations associated with finding a location to validate a ticket voucher for a game service.

SUMMARY OF THE INVENTION

This invention addresses the needs indicated above by providing a hand-held device having a wire-less communication interface, a display screen and a microprocessor which generates a number of game service interfaces on the display screen. The hand-held device may input ticket voucher information and communicate with a remote transaction server such that a ticket voucher may be validated. Additionally, the hand-held device may be used to provide a variety of gaming services using different game service interfaces provided on the device. These hand-held devices may be checked out by a game service representative in a secure manner such that a game service representative may roam a game playing area and provide various game services to game players in the game playing area using the hand-held device. These game services may include a ticket validation, a prize validation, a food service, an accommodation service or a gaming operations services.

One aspect of the present invention provides a hand-held device for providing a game service in a game playing area where the game playing area may be a casino, a restaurant, a hotel, a bar, or a store. The hand-held device can be generally characterized as including 1) a wire-less communication interface, 2) a display screen and 3) a microprocessor where the microprocessor receives game service transaction information from an input mechanism and sends game service transaction information to an output mechanism using the wire-less communication interface and generates one or more game service interfaces on the display screen for providing a game service transaction that enables the game service. Additionally, the hand-held device may include a memory storing game service transaction information from one or more game service transactions where the memory is removable from the hand-held device.

In preferred embodiments, the display screen may be a touch screen and the wire-less communication interface may be a spread spectrum or an infra-red communication interface. The input mechanism may be a card reader, a bar-code reader, a gaming machine, a transaction server, a storage device, a key board, a touch screen, a microphone or a personal digital assistant. The output mechanism may be a card reader, a printer, a transaction server, a gaming machine, a personal digital assistant or a storage device.

In the preferred embodiments, the game service may be a ticket validation, a prize validation, a food service, an accommodation service, or a gaming operations service. In particular, the game service may be an EZ pay ticket validation. The game service interface may be a registration interface, a transaction reconciliation interface, a prize validation interface, a ticket validation interface, a food service interface, an accommodation service interface, a gaming operation interface, a login interface, an input/output interface, a voice interface and an EZ pay ticket validation interface. The game service transaction may be a ticket validation request, a ticket validation reply, operator information, a prize validation request, a prize validation reply, a food service request, a food service reply, an accommodation request, an accommodation reply, a maintenance request, a maintenance reply, a print request, a print reply, or a transaction confirmation or an EZ pay ticket validation request or an EZ pay ticket validation reply. The game service transaction information may be player tracking information, a bar code for an award, a bar code for a prize, a bar code for a food service, and a bar code for a accommodation service or a EZ pay ticket bar code.

Another aspect of the invention provides a method for providing a game service in a game playing area using a hand-held device. The method may be characterized as including the following steps, 1) contacting a game player in the game playing area, 2) selecting a game service interface on the hand-held device, 3) inputting game service transaction information, 4) validating the game service transaction information, and 5) providing a game service where the game service may be comprised of one or more game service transactions. Additionally, the method may include one or more of the following steps, a) prior to contacting the game player, assigning a hand-held device to a game service representative, b) generating a receipt for the game service transaction, c) unassigning the hand-held device to a game service representative and d) reconciling a transaction history stored on a memory on the hand-held device.

In preferred embodiments, the game service interface may be a registration interface, a transaction reconciliation interface, a prize validation interface, a ticket validation interface, a food service interface, an accommodation service interface, a gaming operation interface, a login interface, voice interface or an input/output interface. The game service transaction may be a ticket validation request, a ticket validation reply, player tracking information, operator information, a prize validation request, a prize validation reply, a food service request, a food service reply, an accommodation request, an accommodation reply, a maintenance request, a maintenance reply, a print request, a print reply, or a transaction confirmation. The game service transaction information may be player tracking information, a bar code for an award, a bar code for a prize, a bar code for a food service, a bar code for an EZ pay ticket and a bar code for a accommodation service. The game service transaction information may be input from a card reader, a bar-code reader, a gaming machine, a transaction server, a storage device, a key board, a touch screen, a microphone or a personal digital assistant and may be output to an output mechanism including a printer, a personal digital assistant, a smart card, a transaction server, a gaming machine, or a storage device.

Another aspect of the invention may provide a method for generating a game service transaction in a hand-held device. The method may be characterized as including the following steps, 1) sending a game service transaction validation request to a transaction server wherein the transaction validation request is one or more data packets, 2) receiving a game service transaction validation reply from the transaction server, 3) when the game service transaction is completed, sending a transaction confirmation to the transaction server 4) and when the game service transaction is cancelled, sending a transaction cancellation to the transaction server. The one or more data packets may contain bar code information or player tracking information and may be sent via the wire-less communication interface. For game service transactions (e.g. EZ pay ticket validation, a prize ticket validation, an award ticket validation, a food service, an accommodation service, or a prize service), the transaction validation request may be an EZ pay ticket validation request, a prize validation request, an award validation request, or a maintenance validation request and the transaction validation reply may approve the game service transaction.

Another aspect of the invention may provide a method for generating a game service transaction in a transaction server. The method may be characterized as including the following steps, 1) receiving a transaction validation request from a hand-held device, 2) marking the transaction request pending, 3) generating a transaction validation reply and 4) sending the transaction validation reply to the hand-held device. Additionally, the method may include the steps of a) receiving a transaction confirmation from the hand-held device and marking the transaction complete and b) identifying the clerk validation terminal which owns the ticket and sending a pay request to the clerk validation ticket.

Another aspect of the present invention provides a game service transaction network in a game playing area. The game service transaction network may be characterized as including 1) one or more gaming machines, 2) one or more hand-held devices providing game service transactions in the game playing area using a wire-less communication interface, 3) one or more transaction servers and 4) one or more transaction server receivers allowing the transaction servers to receive communications from the wire-less communication interfaces on the one or more hand-held devices and send communication to the wire-less communication interfaces on the one or more hand-held devices where the gaming machines generate tickets that are read by the hand-held devices. Additionally, the game service transaction network may include one or more transaction relays which relay communications from the hand-held devices to the one or more transaction server receivers. The gaming machines in the game service transaction network may include video slot machines, mechanical slot machines, video black jack machines, video pai gow poker machines, video poker machines and video keno machines.

These and other features of the present invention will be, presented in more detail in the following detailed description of the invention and the associated figures.

DESCRIPTION OF THE PREFERRED EMBODIMENTS

Figure 2:
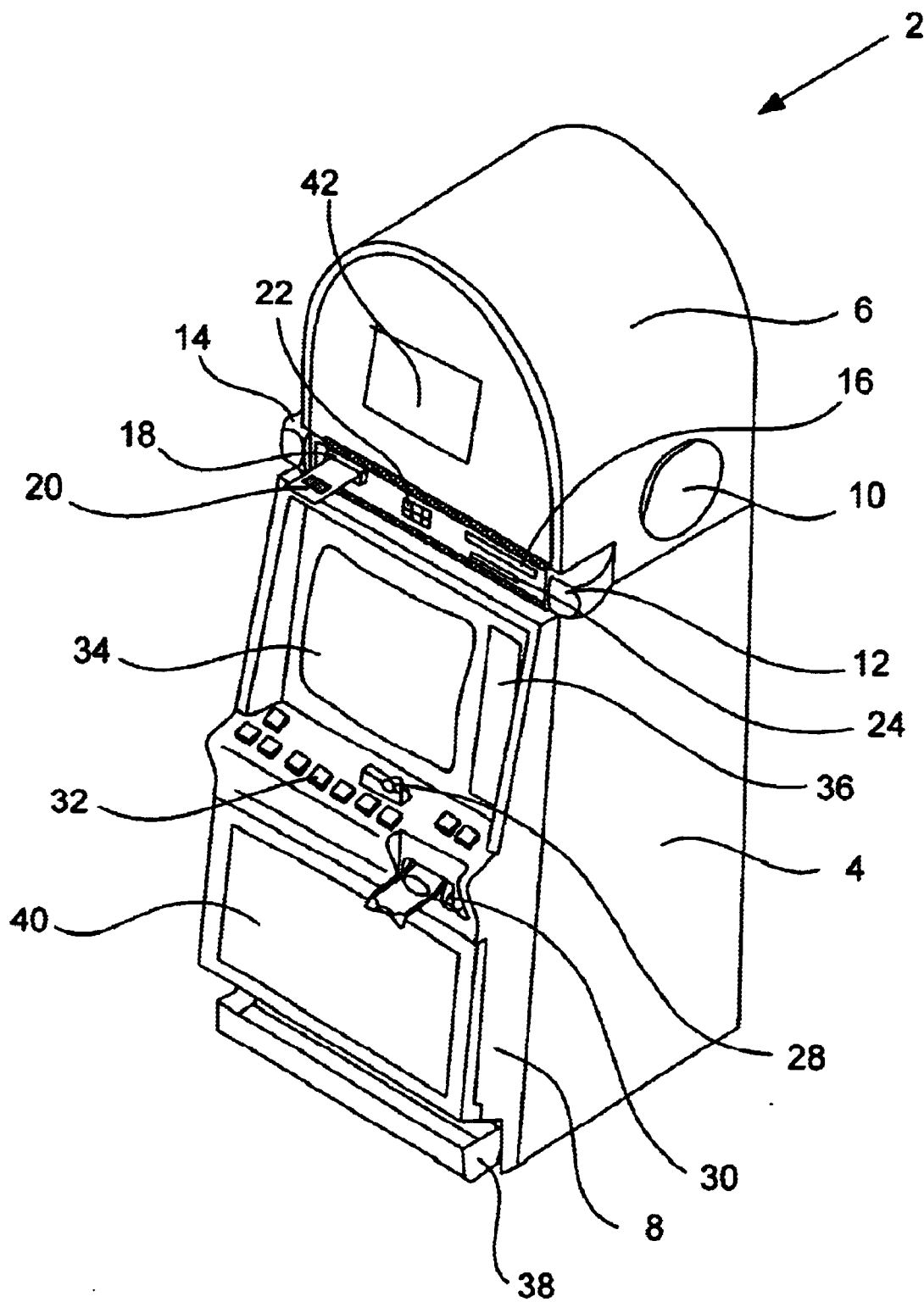
FIG. 2 is a perspective drawing of a gaming machine having a top box and other devices.

Turning first to FIG. 2, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (not shown) housed inside the main cabinet 4 of the machine 2. Many possible games, including traditional slot games, video slot games, video poker, and keno, may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. Further, the top box 6 may house different or additional devices than shown in the FIG. 1. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays-mechanical and/or video. And, some gaming machines are designed for bar tables and have displays that face upwards. Those of skill in the art will understand that the present invention, as described below, can be deployed on most any gaming machine now available or hereafter developed.

Figure 1:
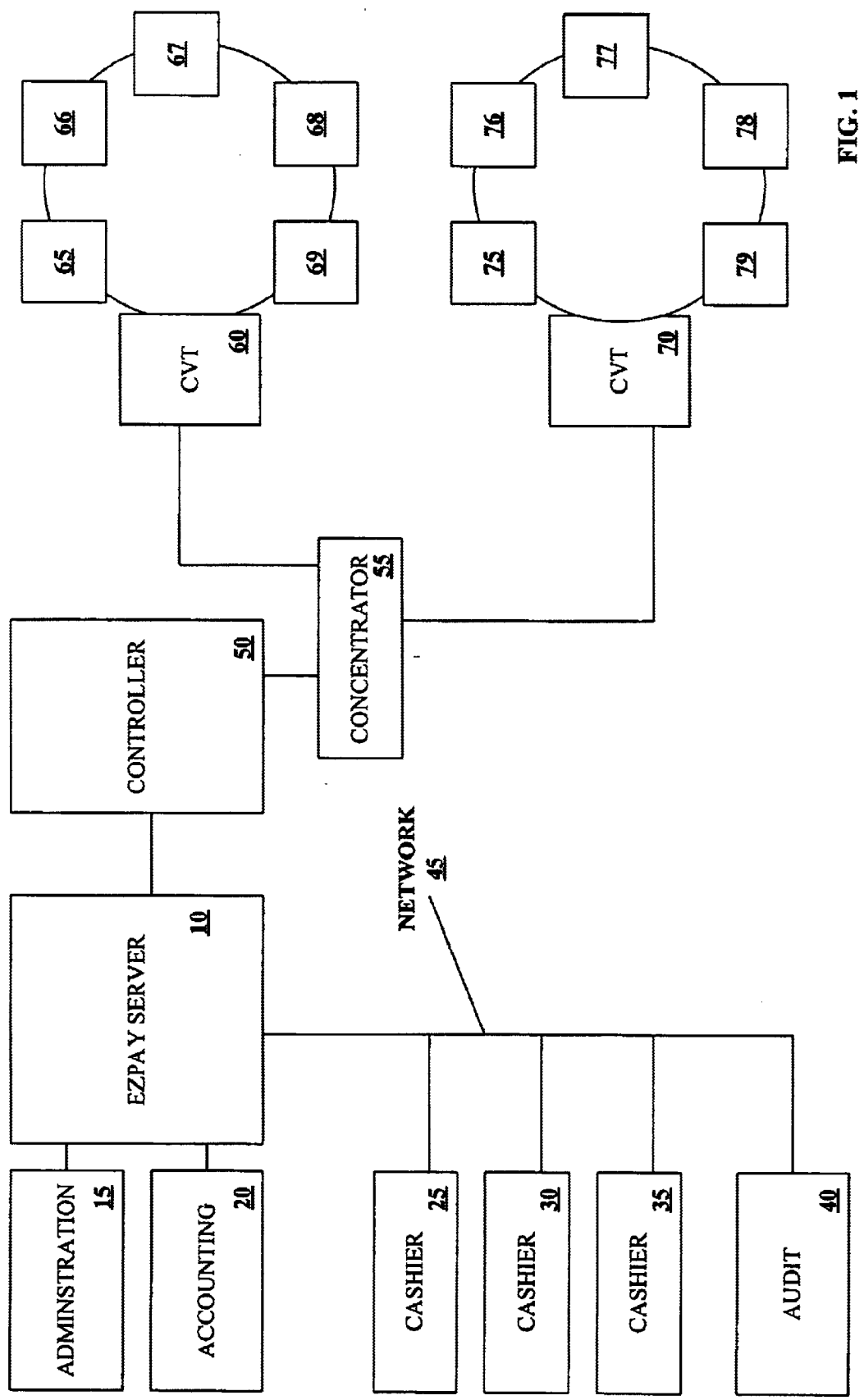
FIG. 1 is a block diagram of the components of an EZ pay ticket voucher system.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. In some embodiments, these tickets may be used by a game player to obtain game services. Hardware and methods used to provide various player game services are described with reference to FIGS. 3, 4, 5 and 6.

Figure 3:
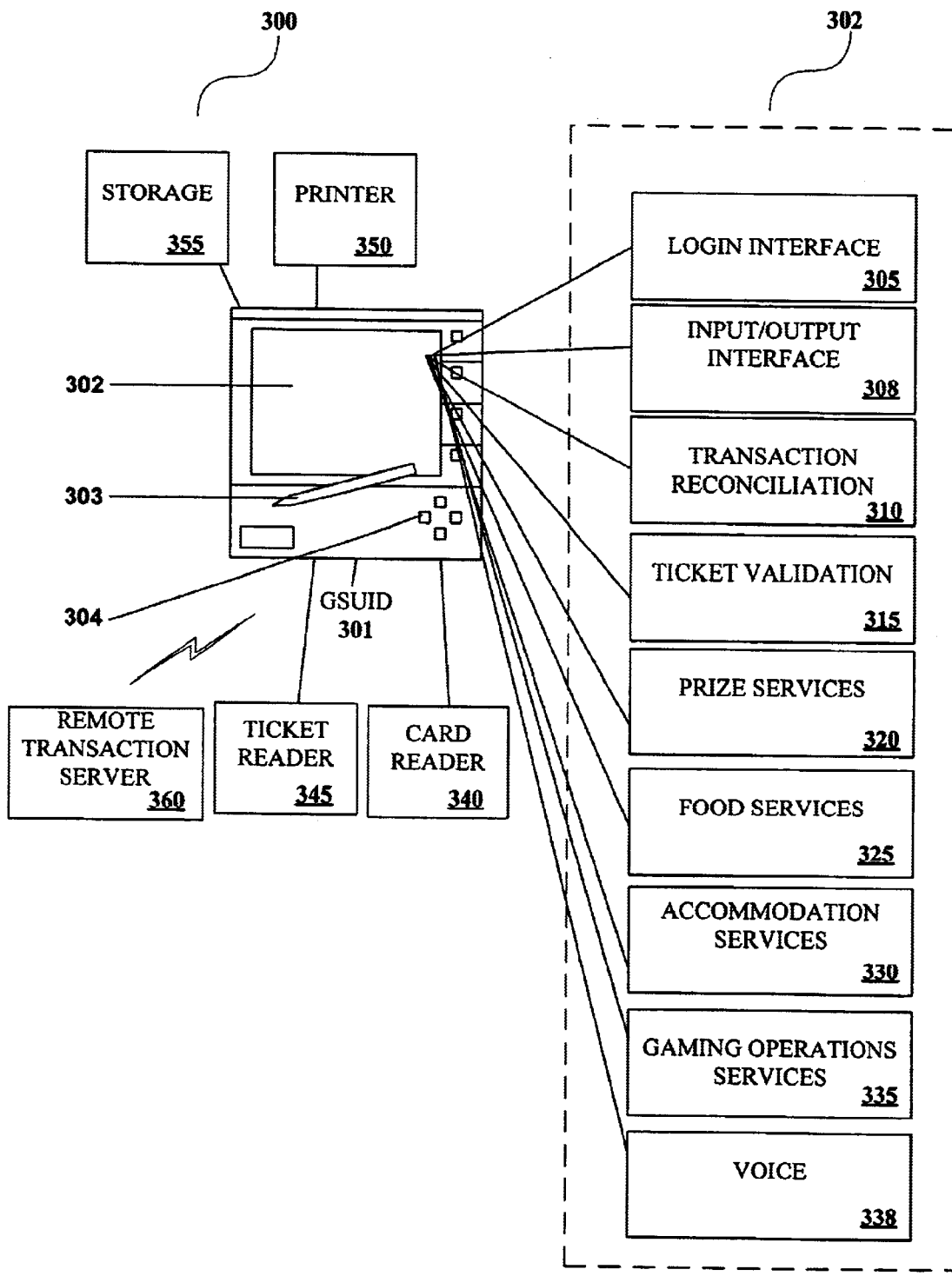
FIG. 3 is a block diagram of a game service system.

FIG. 3 is a block diagram of a game service system. In one embodiment, the game service system 300 is comprised of a hand-held game service user interface device (GSUID) 301 and a number of input and output devices. The GSUID 301 is generally comprised of a display screen 302 which may display a number of game service interfaces 306. These game service interfaces 306 are generated on the display screen 302 by a microprocessor of some type (not shown) within the GSUID 301. Examples of a hand-held GSUID which may accommodate the game service interfaces 306 shown in FIG. 3 are manufactured by Symbol Technologies, Incorporated of Holtsville, N.Y.

The game service interfaces 306 may be used to provide a variety of game service transactions and gaming operations services. The game service interfaces 306, including a login interface 305, an input/output interface 308, a transaction reconciliation interface 310, a ticket validation interface 315, a prize services interfaces 320, a food services interface 325, an accommodation services interfaces 330 and a gaming operations interfaces 335 may be accessed via a main menu with a number of sub-menus that allow a game service representative to access the different display screens relating to the particular interface. Using the different display screens within a particular interface, the game service representative may perform various operations needed to provide a particular game service. For example, the login interface 305 may allow the game service representative to enter a user identification of some type and verify the user identification with a password. When the display screen 302 is a touch screen, the user may enter the user/operator identification information on a display screen comprising the login interface 305 using the input stylus 303 and/or using the input buttons 304. Using a menu on the display screen of the login interface, the user may select other display screens relating to the login and registration process. For example, another display screen obtained via a menu on a display screen in the login interface may allow the GSUID 301 to scan a finger print of the game service representative for identification purposes or scan the finger print of a game player.

The user identification information and user validation information may allow the game service representative to access all or some subset of the available game service interfaces 306 available on the GSUID 301. For example, certain users, after logging into the GSUID 301 (e.g. entering a user identification and a valid user identification information), may be able to access the food services interface 325, accommodation services interface 330, or gaming operation services interface 335 and perform a variety of game services enabled by these game service interfaces 306. While other users may be only be able to access the award ticket validation interface 315 and perform EZ pay ticket validations.

Using the input/output interface 308, a user of the GSUID 301 may be able to send and receive game service transaction information from a number of input mechanisms and output mechanisms. The input/output interface may allow the GSUID user to select, from a list of devices stored in a memory on the GSUID 301, a device from which the GSUID may input game service transaction information or output game service transaction information. For example, the GSUID 301 may communicate with a ticket reader 345 that reads game service transaction information from bar-coded tickets. The bar-codes may be read using a bar-code reader of some type. The bar-coded tickets may contain bar-code information for awards, prizes, food services, accommodation services and EZ pay tickets. Additionally, the bar-coded tickets may contain additional information including player tracking information that relate the ticket to a specific game player. The information on a ticket is not necessarily in bar-code format and may be in any format readable by a particular ticket reader 345. As another example, the GSUID 301 may input information from a card reader 340 that reads information from magnetic striped cards or smart cards. The cards may contain player tracking information or other information regarding the game playing habits of the user presenting the card.

The GSUID 301 may output game service transaction information to a number of devices. For example, to print a receipt, the GSUID 301 may output information to a printer 350. In this game service transaction, the GSUID 301 may send a print request to the printer 350 and receive a print reply from the printer 350. The printer 350 may be a large device at some fixed location or a portable device carried by the game service representative. As another example, the output device may be a card reader 340 that is able to store information on a magnetic card or smart card. Other devices which may accept input or output from the GSUID 301 are personal digital assistants, microphones, keyboard, storage devices, gaming machines and remote transaction servers.

The GSUID 301 may communicate with the various input mechanisms and output mechanisms using both wire and wire-less communication interfaces. For example, the GSUID 301 may be connected to a ticket reader 345 by a wire connection of some type. However, the GSUID 301 may communicate with a remote transaction server 360 via a wire-less communication interface including a spread spectrum cellular network communication interface. An example of a spread spectrum cellular network communication interface is Spectrum 24 offered by Symbol Technologies of Holtsville, N.Y., which operates between about 2.4 and 2.5 GigaHertz. As another example, the GSUID 301 may communicate with the printer 350 via an infra-red wire-less communication interface. The information communicated using the wire-less communication interfaces may be encrypted to provide security for certain game service transactions such as validating a ticket for a cash pay out. Some devices may accommodate multiple communication interfaces. For example, a gaming machine may contain a wire-less communication interface for communication with the GSUID 301 or a port where a cable from the GSUID 301 may be connected to the gaming machine.

Another type of game service interface that may be stored on the GSUID 301 is an award ticket validation interface 315. One embodiment of the award ticket interface 315 may accommodate the EZ pay ticket voucher system and validate EZ pay tickets as previously described. However, when other ticket voucher systems are utilized, the award ticket validation interface 315 may be designed to interface with the other ticket voucher systems. Using the award ticket validation interface, a game service representative may read information from a ticket presented to the game service representative by a game player using the ticket reader and then validate and pay out an award indicated on the ticket.

Typically, the award ticket contains game service transaction information which may be verified against information stored on a remote transaction server 360. To validate the ticket may require a number of game service transactions. For example, after the obtaining game service transaction information from the award ticket, the GSUID 301 may send a ticket validation request to the remote transaction server 360 using the spread spectrum communication interface and receive a ticket validation reply from the remote server 360. In particular, the validation reply and the validation request may be for an EZ pay ticket. After the award ticket has been validated, the GSUI 301 may send a confirmation of the transaction to the remote server 360. Details of the game service transaction information validation process are described with reference to FIG. 6. In other embodiments, the award ticket interface may be configured to validate award information from a smart card or some other portable information device or validate award information directly from a gaming machine.

As game service transactions are completed, game service transaction information may be stored on a storage device 355. The storage device 355 may be a remote storage device or a portable storage device. The storage device 355 may be used as a back-up for auditing purpose when the memory on the GSUID 301 fails and may be removable from the GSUID 301.

Another type of game service interface that may be stored on the GSUID 301 is a prize service interface 320. As an award on a gaming machine, a game player may receive a ticket that is redeemable for merchandise including a bike, a computer or luggage. Using the prize service interface 320, the game service representative may validate the prize service ticket and then check on the availability of certain prizes. For example, when the prize service ticket indicates the game player has won a bicycle, the game service representative may check whether the prize is available in a nearby prize distribution center. The GSUID 301 may validate the prize ticket and check on the availability of certain prizes by communicating with a remote prize server. Further, the game service representative may have the prize shipped to a game player's home or send a request to have the prize sent to a prize distribution location. The game service transactions needed to validate the prize ticket including a prize validation request and a prize validation reply, check on the availability of prizes and order or ship a prize may be implemented using various display screens located within the prize interface. The different prize screens in the prize service interface may be accessed using a menu located on each screen of the prize service interface. In other embodiments, the prize service interface may be configured to validate prize information from a smart card or some other portable information device or validate award information directly from a gaming machine. A more complete discussion of the use of prize servers is provided in commonly assigned, copending U.S. patent application Ser. No. 09/515,717 entitled NAME YOUR PRIZE GAME PLAYING METHODOLOGY filed Feb. 29, 2000, the entire specification of which is incorporated herein by reference.

Another type of game service interface that may be stored on the GSUID 301 is a food service interface 325. As an award on a gaming machine or as compensation for a particular amount of game play, a game player may receive a ticket that is redeemable for a food service including a free meal, a free drink or other food prizes. Using the food service interface 325, the game service representative may validate the food service ticket and then check on the availability of certain prizes. For example, when the game player has received an award ticket valid for a free meal, the food service interface may be used to check on the availability of a dinner reservation and make a dinner reservation. As another example, the GSUID may be used to take a drink order for a player at a gaming machine. The GSUID 301 may validate the food service ticket and check on the availability of certain food awards by communicating with a remote food server. The game service transactions needed to validate the food ticket, check on the availability of food services, request a food service and receive a reply to the food service request may be implemented using various display screens located within the food service interface. These display screens may be accessed using a menu located on each screen of the food service interface. In other embodiments, the food service interface may be configured to validate food service information from a smart card or some other portable information device.

Another type of game service interface that may be stored on the GSUID 301 is an accommodation service interface 330. As an award on a gaming machine or as compensation for a particular amount of game play, a game player may receive a ticket that is redeemable for a accommodation service including a room upgrade, a free night's stay or other accommodation prize. Using the accommodation service interface 330, the game service representative may validate the accommodation service ticket and then check on the availability of certain accommodation prizes. For example, when the game player has received an award ticket valid for a room upgrade, the accommodation service interface may be used to check on the availability of a room and make a room reservation. As another example, the GSUID may be used to order a taxi or some other form of transportation for a player at a gaming machine preparing to leave the game playing area. The game playing are may be a casino, a hotel, a restaurant, a bar or a store.

The GSUID 301 may validate the accommodation service ticket and check on the availability of certain accommodation awards by communicating with a remote accommodation server. The game service transactions needed to validate the accommodation ticket, check on the availability of accommodation services, request an accommodation service and receive a reply to the accommodation service request may be implemented using various display screens located within the accommodation service interface. These display screens may be accessed using a menu located on each screen of the accommodation service interface. In other embodiments, the accommodation service interface may be configured to validate accommodation service information from a smart card or some other portable information device.

Another type of game service interface that may be stored on the GSUID 301 is a gaming operations service interface 335. Using the gaming a service interface 335 on the GSUID 301, a game service representative may perform a number of game service transactions relating to gaming operations. For example, when a game player has spilled a drink in the game playing area, a game service representative may send a request to maintenance to have someone clean up the accident and receive a reply from maintenance regarding their request. The maintenance request and maintenance reply may be sent and received via display screens selected via a menu on the screens of the gaming operations service interface. As another example, when a game service representative observes a damaged gaming machine such as a broken light, the game service representative may send a maintenance request for the gaming machine using the GSUID 301.

Another type of game service interface that may be stored on the GSUID 301 is a transaction reconciliation interface 310. Typically, the GSUID 301 contains a memory storing game service transaction information. The memory may record the type and time when particular game service transactions are performed. At certain times, the records of the game service transactions stored within the GSUID 301 may be compared with records stored at an alternate location. For example, for an award ticket validation, each time an award ticket is validated and paid out, a confirmation is sent to a remote server 360. Thus, information regarding the award tickets, which were validated and paid out using the GSUID, should agree with the information regarding transactions by the GSUID stored in the remote server 360. The transaction reconciliation process involves using the transaction reconciliation interface to compare this information.

Another type of game service interface that may be stored on the GSUID 301 is a voice interface 338. Using the spread spectrum cellular network incorporated into the GSUID, a game service representative may use the GSUID 301 as a voice communication device. This voice interface 338 may be used to supplement some of the interfaces previously described. For example, when a game player spills a drink the game service representative may send maintenance request and receive a maintenance reply using the voice interface 338 on the GSUID 301. As another example, when a game player requests to validate a food service such as free meal, the game service representative may request a reservation at a restaurant using the voice interface 338 on the GSUID 301.

Figure 4:
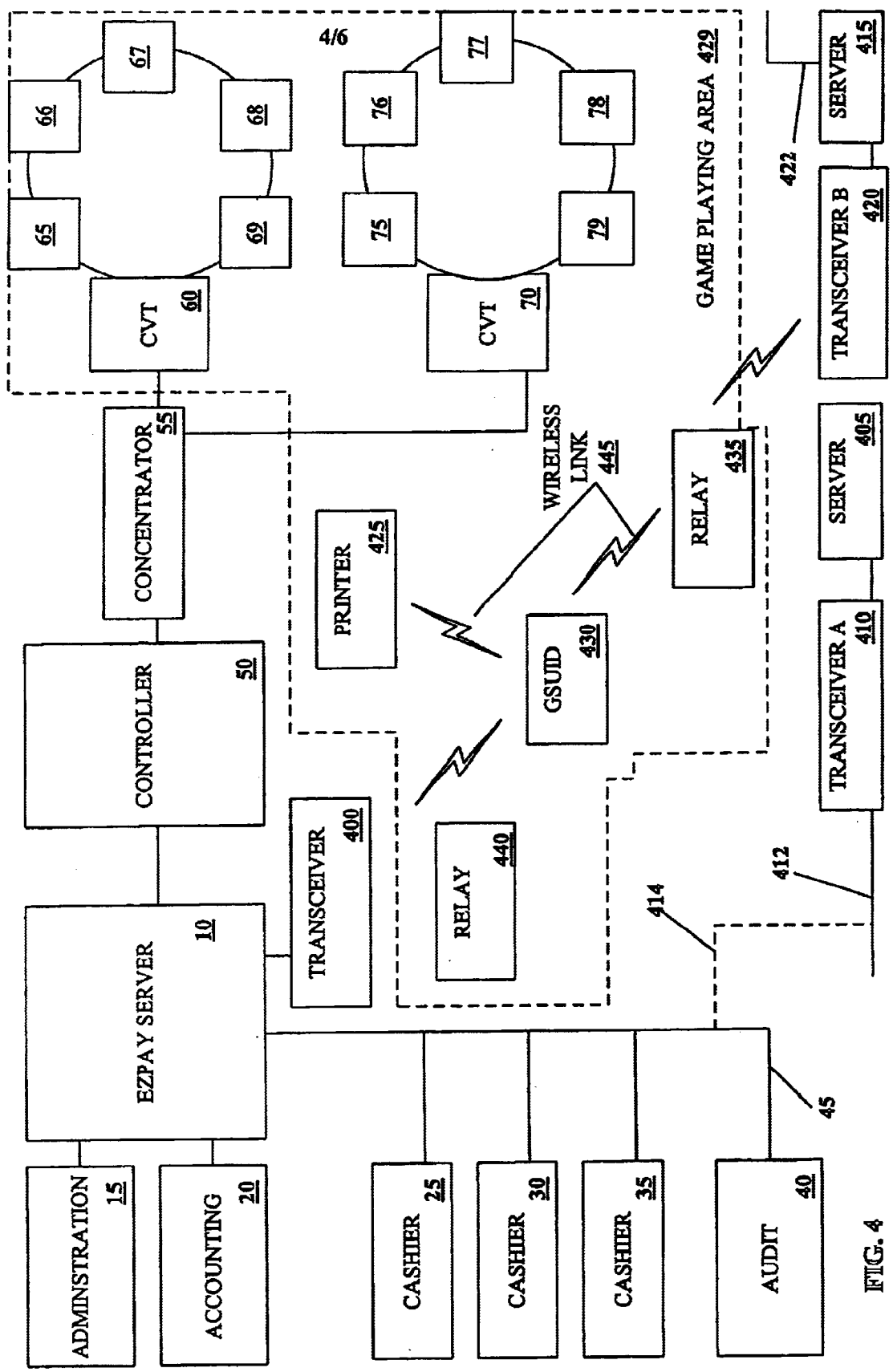
FIG. 4 is a block diagram of a game service transaction network.

FIG. 4 is a block diagram of a game service transaction network. In one embodiment, the game service transaction network comprises the EZ pay award ticket system described with reference to FIG. 1, one or more hand-held game service user interface devices (GSUIDs) as described with reference to FIG. 3, a printer 425, wire-less communication relays 440 and 435, and wire-less transceivers 400, 410, 420 connected to remote transaction servers 10, 405 and 415. After checking out a GSUID 430 and logging into the GSUID 430, a game service representative may roam the game playing area 429 and contact game players in the game playing area 429. The game playing area may be a casino, a hotel, a restaurant, a store or a bar. While playing one or more gaming machines 65, 66, 67, 68, 69, 75, 76, 77, 78 and 79 in the game playing area 429, a game player may receive tickets that require or allow a game service including an award ticket validation, an EZ pay ticket validation, a prize service, a food service, or an accommodation service. The game players may attempt to validate award tickets or EZ pay tickets at the CVTs 60 and 70, at the cashier stations 25, 30 and 35, or by making contact with a game service representative roaming the game player area 429 with a GSUID 430. For other game services including food services or accommodation services, the game player may have to contact a game service representative with a GSUID 430.

When a game service representative contacts a game player seeking a game service in the game playing area 429, the game service representative uses an appropriate game service interface on the display screen of the GSUID 430, as described with reference to FIG. 3, to provide the game service requested by the game player. For example, when a game player requests an EZ pay ticket validation, the game service representative brings the EZ pay ticket validation interface onto the display screen of the GSUID 430 using menus available on the display screen. Then, the game service representative scans the EZ pay ticket using a ticket reader connected to the GSUID 430 to obtain unique ticket information. Next, the GSUID 430 sends an EZ pay ticket validation request using the wire-less communication interface to the EZ pay server 10.

Typically, the ticket validation request is composed of one or more information packets compatible with the wire-less communication standard being employed. Using the wire-less link 445, the one or more information packets containing the ticket validation request are sent to a transceiver 400 connected to the EZ pay server. The transceiver 400 is designed to receive and send messages from the one or more GSUIDs in the game playing area 429 in a communication format used by the GSUIDs. Depending on the location of the GSUID 430 in the game playing area, the communication path for the information packets to and from the GSUID 430 may be through one or more wire-less communication relays including 435 and 440. For example, when the GSUID 430 is located near gaming machine 77, the communication path for a message from the GSUID 430 to the EZ pay server 10 may be from the GSUID 430 to the relay 435, from the relay 435 to the relay 440, from the relay 440 to the transceiver 400 and from the transceiver 400 to the EZ pay server. As the location of the GSUID 430 changes in the game playing area 429, the communication path between the GSUID 430 and the EZ pay server 10 may change.

After receiving an EZ pay ticket validation reply from the EZ pay server 10, the EZ pay ticket may be validated using an appropriate display screen on the GSUID 430. After cashing out the ticket, the game service representative may send a confirmation of the transaction to the EZ pay server 10 using the GSUID 430. The transaction history for the GSUID 430 may be stored on the GSUID 430 as well as the EZ pay server 10. Next, a receipt for the transaction may be printed out. The receipt may be generated from a portable printer carried by the game server representative and connected to the GSUID 430 in some manner or the receipt may be generated from a printer 425 at a fixed location.

After providing a number game services comprising a number of game service transactions to different game players in the game playing area 429 using the GSUID 430, a game service representative may log-off of the GSUID 430 and return it to location for secure storage. For example, at the end of a shift, the game service representative may check the GSUID 430 at some the location, the device is unassigned to the particular game service representative and then may be assigned to another game service representative. However, before the GSUID 430 is assigned to another game service representative, the transaction history stored on the GSUID 430 may be reconciled with a separate transaction history stored on a transaction server such as the EZ pay server 10.

The assigning and unassigning of the GSUID to a game service representative and the transaction reconciliation are performed for security and auditing purposes. Another security measure which may be used on a GSUID 430 is a fixed connection time between the GSUID 430 and a transaction server. For example, after a GSUID 430 has been assigned to a game service representative and the game service representative has registered on the GSUID 430, the GSUID 430 may establish a connection with one or more transaction servers including the EZ pay server 10, a server 405 or a server 420. The connection between a transaction server and the GSUID 430 allows the GSUID 430 to send information to the transaction server and receive information from the transaction server. The length of this connection may be fixed such that after a certain amount of time the connection between the GSUID 430 and the transaction server is automatically terminated. To reconnect to the transaction server, the login and registration process must be repeated on the GSUID 430.

A transaction server may provide one or more game service transactions. However, the GSUID 430 may connect with multiple transaction servers to obtain different game service transactions. For example, server 405 may be a prize transaction server allowing prize service transactions and server 415 may be a food transaction server allowing food service transactions. When a game service representative receives a prize service request from a game player, the GSUID 430 may be used to contact the prize transaction server 405 using a wire-less communication link between the GSUID 430 and a transceiver 410 connected to the prize transaction server 405. Similarly, when a game service representative receives a food service request from a game player, the GSUID 430 may be used to contact the food transaction server 415 using a wire-less communication link between the GSUID 430 and a transceiver 420 connected to the food transaction server 405.

The different transaction servers including the servers 10, 405, 415 may be on separate networks or linked in some manner. For example, server 415 is connected to network 422, server 10 is connected to network 45, and server 405 is connected to network 412. In this embodiment, a network link 414 exists between network 412 and network 45. Thus, server 10 may communicate with server 405 via the network link 414. A communication link between different servers may allow the servers to share game service transaction information and allow different communication paths between the GSUIDs and the transaction servers.

Figure 5:
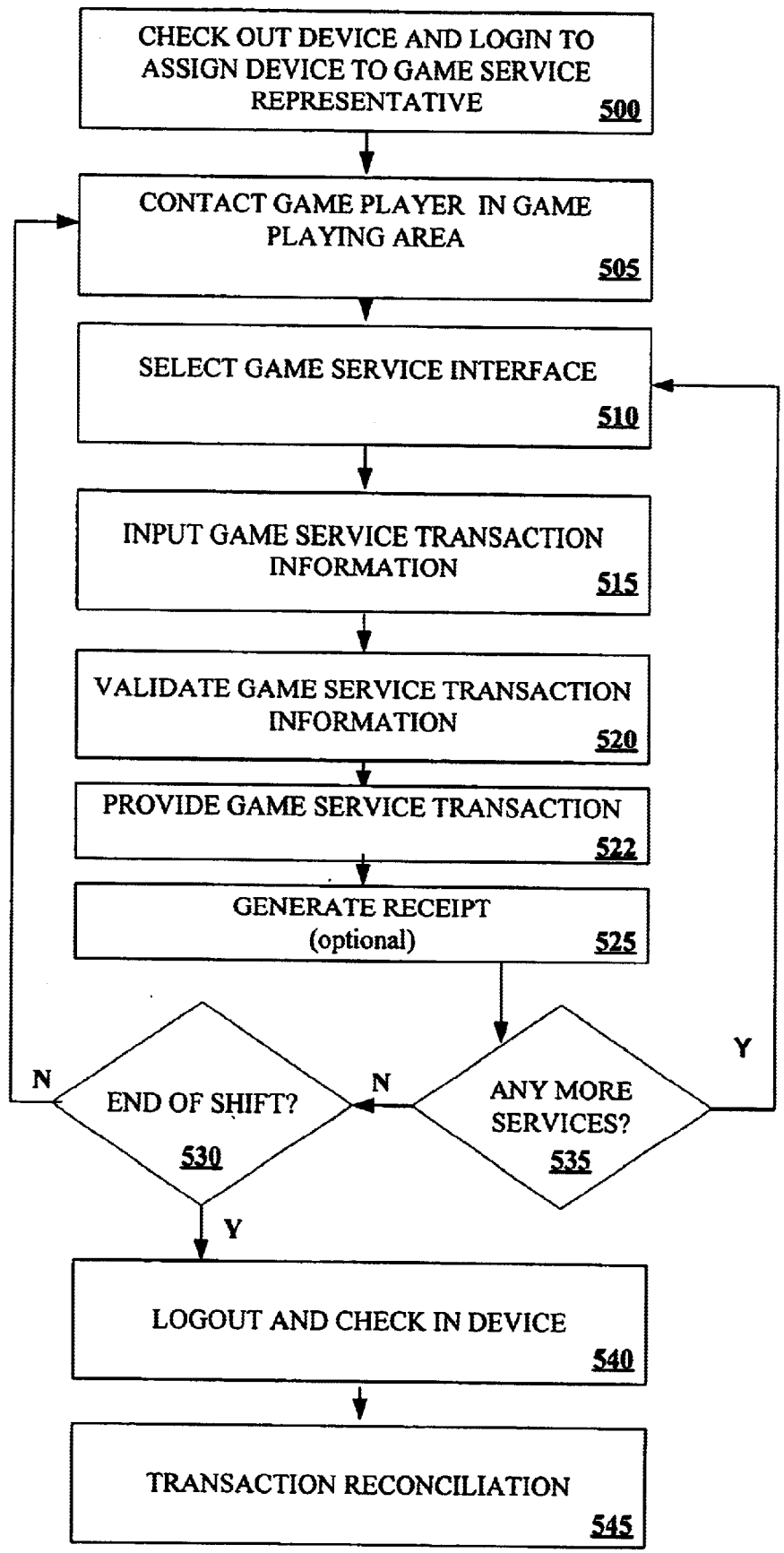
FIG. 5 is a flow chart depicting a method for providing a game service using a hand-held device.

FIG. 5 is a flow chart depicting a method for providing a game service using a hand-held device. In step 500, a game service representative receives a hand-held game service user interface device (GSUID) and logs in to the device to assign the device. The check out process and assign process are for security and auditing purposes. In step 505, the game service representative contacts a game player in the game playing area requesting a game service of some type. In step 510, the game service representative selects an appropriate interface on the GSUID using menus on the display screen of the GSUID that allow the game service representative to provide a requested game service. In step 515, the game service representative inputs game service transaction information required to perform a game service transaction. For example, to validate an award ticket, the game service representative may read information from the ticket using a ticket reader. As another example, to provide a food service including a dinner reservation, the game service representative may enter a game player's name to make the reservation.

In step 520, the transaction information obtained in step 515 is validated as required. For example, when a player attempts to cash out an award ticket, the information from the award is validated to ensure the ticket is both genuine (e.g. the ticket may be counterfeit) and has not already been validated. The validation process requires a number of transfers of information packets between the GSUID and the transaction server. The details of the validation process for an award ticket validation are described with reference to FIG. 6. When the transaction information is valid, in step 522, a game service transaction is provided. For example, a room reservation may be made for a player requesting an accommodation service. A confirmation of the game service transaction may be sent to the transaction server for transaction reconciliation in step 545. In step 525, a receipt may be generated for the game service transaction.

In step 535, after generating a receipt for one service, a game player may request another game service. When a game player request an additional game service, the game service representative returns to step 510 and selects an appropriate interface for the game service. When a game player does not request an additional service and it is not the end of a shift, in step 530, the game service representative returns to step 505 and contacts a new game player. In step 540, when a shift has ended, the game service representative logs out of the GSUID and checks the device at a secure location so that the GSUID may be assigned to a different game service representative. In step 545, before the GSUID is assigned to a different game service representative, a transaction history reconciliation is performed to ensure that the transaction history stored on the GSUID is consistent with the transactions previously confirmed with a transaction server during the game service representative's shift. The transaction history on the GSUID may be stored on a removable memory storage device on the GSUID. Thus, the memory may be removed from the device for transaction reconciliation and replaced with a new memory. Thus, the device with the new memory may be assigned to a new game service representative while the transaction history from the previous game service representative assigned to the device is reconciled.

Figure 6:
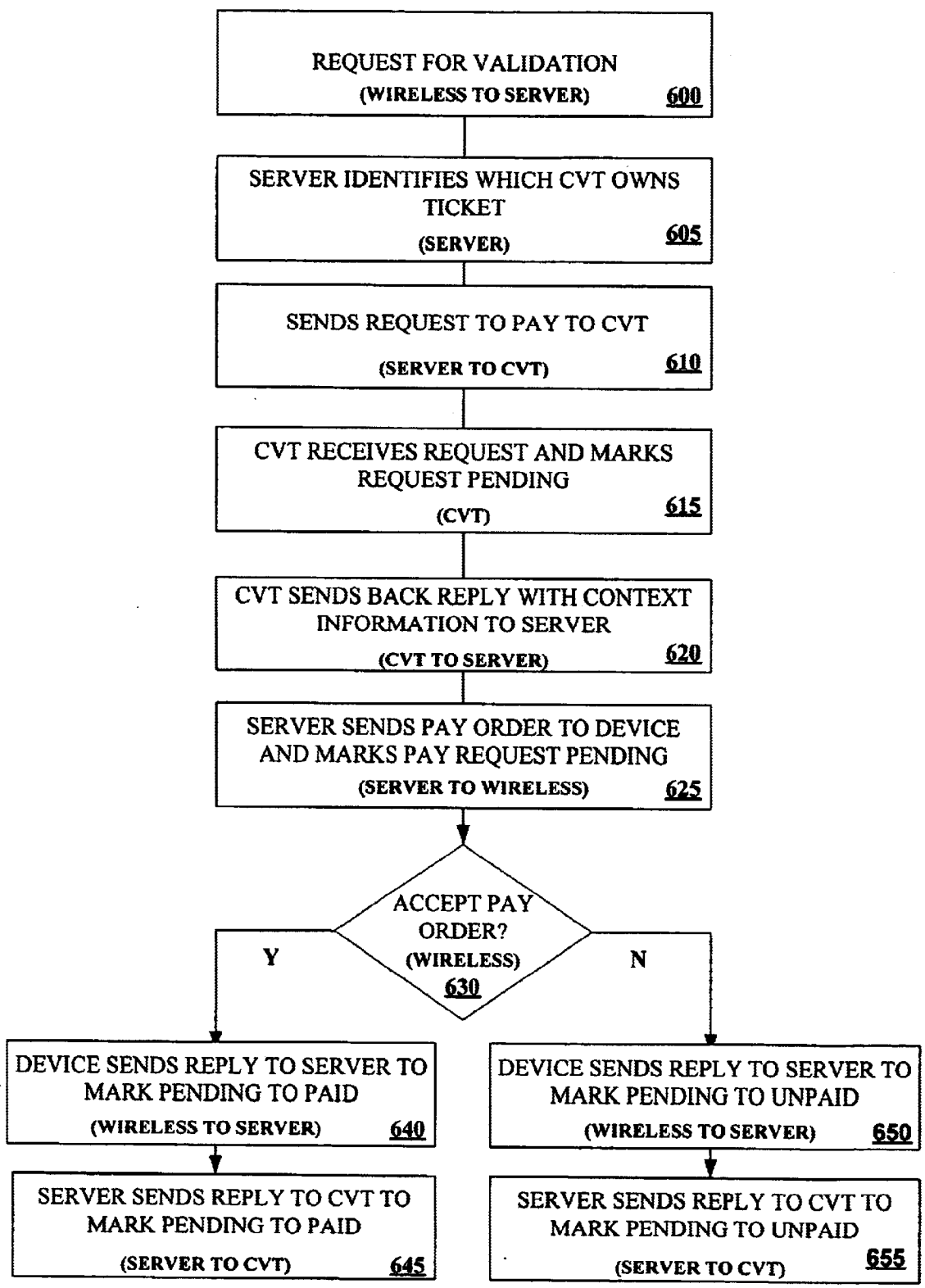
FIG. 6 is a flow chart depicting a method for validating information for providing a personal game service.

FIG. 6 is a flow chart depicting a method for validating information for providing a personal game service. In the embodiment shown in the figure, a ticket is validated in a manner consistent with an EZ pay ticket system. The EZ pay ticket is usually used for award tickets. However, the system may be adapted to provide tickets for other services include food services, prize services or accommodation services. In step 600, a request for game service transaction information read from a ticket is sent via a wire-less communication interface on the GSUID to the appropriate transaction server as described with reference to FIG. 4. In step 605, the server identifies which clerk validation ticket owns the ticket. When a CVT owns a ticket, the CVT has stored information regarding the status of a particular ticket issued from a gaming machine connected to the CVT. In step 610, the server sends a request to pay the ticket to the CVT identified as the owner of the ticket. Typically, the pay request indicates a service on the ticket has been requested. For a cash ticket, a pay request means a request to cash out the ticket has been made. For a free meal, a pay request means a request to obtain the meal has been made. In step 615, the CVT receives the pay request for the ticket and marks the ticket pending. While the ticket is pending, any attempts to validate a ticket with similar information is blocked by the CVT.

In step 620, the CVT sends back a reply with context information to the server. As an example, the context information may be the time and place when the ticket was issued. The information from the CVT to the server may be sent as one or more date packets according to a communication standard shared by the CVT and server. In step 625, after receiving the validation reply from the CVT, the server marks the pay request pending and sends a pay order to the GSUID. While the pay request is pending, the server will not allow another ticket with the same information as the ticket with the pay request pending to be validated.

In step 630, the game service representative may chose to accept or reject the pay order from the server. When the game service representative accepts the pay order from the server, in step 640, the GSUID sends a reply to the transaction server confirming that the transaction has been performed. The transaction server marks the request paid which prevents another ticket with identical information from being validated. In step 645, the server sends a confirmation to the CVT which allows the CVT to mark the request from pending to paid. When the game service representative rejects the pay order from the server, in step 650, the GSUID sends a reply to the server to mark the pay request from pending to unpaid. When the ticket is marked unpaid, it may be validated by another GSUID or other validation device. In step 655, the server sends the reply to the CVT to mark the pay request from pending to unpaid which allows the ticket to be validated.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. In a transaction server, a method for generating a game service transaction, the method comprising;
    receiving a transaction validation request for validating a voucher from a portable hand-held device via wireless communications wherein the validation of the voucher is for allowing the indicia of credit amount stored on the voucher to be exchanged for cash when a game player presents the voucher to a non-game player utilizing the portable hand-held device in game playing area;
    marking the transaction validation request pending;
    determining whether to approve or reject the validation of the voucher;
    generating a transaction validation reply indicating whether the validation of the voucher has been approved or rejected;
    sending the transaction validation reply to the hand-held device via wireless communications.

2. The method of claim 1, further comprising receiving a transaction confirmation from the portable hand-held device and marking the transaction complete.

3. The method of claim 1, further comprising
    receiving a second transaction validation request for performing a game service transaction from a portable hand-held device via wireless communications;
    marking the transaction validation request pending;
    determining whether to approve or reject the game service transaction;
    generating a transaction validation reply indicating whether the game service transaction has been approved or rejected;
        sending the transaction validation reply to the hand-held device via wireless communications.

4. The method of claim 3, wherein the game service transaction is selected from the group consisting of a prize ticket validation, a food service, an accommodation service, and a prize service and a maintenance service.

5. A game service transaction network in a game playing area, the game service transaction network comprising;
    one or more gaming machines;
    one or more portable hand-held devices providing game service transactions in the game playing area using a wire-less communication interface wherein the portable hand-held devices are adapted for validating a voucher storing an indicia of credit amount and wherein the validation of the voucher is for allowing the indicia of credit amount stored on the voucher to be exchanged for cash when a game player presents the voucher to a non-game player utilizing the portable hand-held device in the game playing area;
    one or more transaction servers; and
    one or more transaction server transceivers allowing the transaction servers to receive communications from the wire-less communication interfaces on the one or more portable hand-held devices and send communications to the wire-less communication interfaces on the one or more portable hand-held devices
    wherein at least the gaming machines are capable of generating the voucher storing the indicia of credit amount.

6. The game service transaction network of claim 5, further comprising one or more transaction relays that allow communications from the hand-held devices to be relayed to the one or more transaction server receivers.

7. The game service transaction network of claim 5, wherein the one or more gaming machines are each selected from the group consisting of video slot, mechanical slot, video black jack, video pai gow poker, video poker and video keno.

8. A method of exchanging an indicia of credit for cash using a portable hand-held device capable of providing one or more types of game service transactions, the method comprising:
    in the portable hand-held device, receiving a request for validating a voucher storing an indicia of credit amount wherein the validation of the voucher is for allowing the indicia of credit amount stored on the voucher to be exchanged for cash when a game player presents the voucher to a non-game player utilizing the portable hand-held device in a game playing area and wherein the validation of the voucher is one of the one or more types of game service transactions provided on the portable hand-held device;
    sending a game service transaction validation request for validation of the voucher from the portable hand-held device to a transaction server via wireless communications wherein the game service transaction validation request comprises one or more data packets; and
    receiving a game service transaction validation reply from the transaction server in the portable hand-held device via wireless communications wherein the game service transaction validation reply approves or rejects the validation of the voucher.

9. The method of claim 8, wherein the portable hand-held device is operable at a plurality of locations within a game playing area.

10. The method of claim 9, wherein the game playing area is one of a casino, a restaurant, a hotel, a bar, a store and combinations thereof.

11. The method of claim 8, wherein the one or more data packets comprise information stored on the voucher used by the transaction server to approve or reject the validation of the voucher.

12. The method of claim 8, wherein the one or more data packets comprise at least one of player tracking information, player identification information and combinations thereof.

13. The method of claim 8, wherein the voucher is selected from the group consisting of a printed ticket, a smart card and a magnetic-striped card.

14. The method of claim 8, wherein voucher is a printed ticket and information used to validate the printed ticket voucher is stored on the printed ticket voucher in a bar-code format.

15. The method of claim 8, wherein the portable hand-held device comprises one or more of a touch screen display, a wireless interface, input buttons, a processor, a memory and combinations thereof.

16. The method of claim 8, further comprising:

receiving at least one of voucher information or game service transaction information from an input mechanism connected to the portable hand-held device.

17. The method of claim of claim 16, wherein the input mechanism is selected from the group consisting of a card reader, a bar-code reader, a gaming machine, a transaction server, a storage device, a key board, a touch screen, a microphone or a personal digital assistant.

18. The method of claim 8, further comprising:

outputting at least one of voucher information or game service transaction information to an output mechanism connected to the portable hand-held device.

19. The method of claim 18, wherein the external device is selected from the group consisting of a printer, a personal digital assistant, a smart card, a transaction server, a gaming machine, or a storage device.

20. The method of claim 8, further comprising:

when the cash has been exchanged, sending a transaction confirmation to the transaction server from the portable hand-held device.

21. The method of claim 8, further comprising:

when the validation of the voucher is cancelled, sending a transaction cancellation to the transaction server from the portable hand-held device.

22. The method of claim 8, further comprising:

generating one or more game service interfaces and displaying the one or more game service interfaces on a display on the portable hand-held device.

23. The method of claim 22, wherein the one or more game services interfaces are selected from the group consisting of a login interface, an input/output interface, a voucher validation interface, a prize services interface, a food services interface, an accommodation services interface and a gaming operation interface.

24. The method of claim 8, further comprising:

generating a menu of game service interfaces in the portable hand-held device;

receiving a selection of a game service interface from the menu of game service interfaces on the portable hand-held device via an input mechanism; and displaying the selected game service interface to a display on the portable hand-held device.

25. The method of claim 8, further comprising:

generating a login interface on a display on the portable hand-held device;

receiving login information from an input mechanism on the portable hand-held device; and authorizing access to the portable hand-held device using the login information.

26. The method of claim 8, further comprising:

storing records of at least one of approved gaming transactions or approved voucher validations to a memory on the portable hand-held device.

27. The method of claim 26, further comprising:

comparing the records of the at least the approved gaming transactions or the approved voucher validations stored on the hand-held device to records of approved gaming transactions stored on the transaction server.

28. The method of claim 8, wherein the voucher storing an indicia of credit amount is generated from a play of a game of chance.

29. The method of claim 28, wherein the game of chance is selected from the group consisting of video slot games, mechanical slot games, video blackjack games, video pai gow poker games, video poker games and video keno games.

30. The method of claim 8, further comprising:

in the portable hand-held device, receiving a request to perform a second type of game service transaction different from the validation of the voucher;

sending the game service transaction validation request for the second type of game service transaction from the portable hand-held device to the transaction server via wireless communications; and receiving a game service transaction validation reply from the transaction server in the portable hand-held device via wireless communications wherein the game service transaction validation reply comprises information that at least one of approves the second type of game service transaction or rejects the second type of game service transaction.

31. The method of claim 30, wherein the second type of game service transaction is selected from the group consisting of a prize ticket validation, a food service, an accommodation service, and a prize service and a maintenance service.

* * * * *